(12) United States Patent
Babcock (10) Patent No.: US 9,345,203 B2
(45) Date of Patent: May 24, 2016

(54) TRELLISING SYSTEM AND VITICULTURE METHOD

(76) Inventor: Bryan Babcock, Santa Barbara, CA (US)

( * ) Notice: Subject to any disclaimer, the term of this patent is extended or adjusted under 35 U.S.C. 154(b) by 582 days.

(21) Appl. No.: 13/572,296

(22) Filed: Aug. 10, 2012

(65) Prior Publication Data

US 2014/0041294 A1 Feb. 13, 2014

(51) Int. Cl.
*A01G 17/06* (2006.01)
*A01G 17/10* (2006.01)
*A01G 9/12* (2006.01)
*A01G 17/04* (2006.01)
*A01G 17/00* (2006.01)

(52) U.S. Cl.
CPC *A01G 17/06* (2013.01); *A01G 9/12* (2013.01); *A01G 17/005* (2013.01); *A01G 17/10* (2013.01)

(58) Field of Classification Search
CPC ......... A01G 17/06; A01G 9/12; A01G 17/04; A01G 17/14; A01G 17/08; A01G 9/128; A01G 17/10; A01G 17/005
USPC ............................................ 47/46, 44, 70
See application file for complete search history.

(56) References Cited

U.S. PATENT DOCUMENTS

| 4,625,454 | A | * | 12/1986 | Daniell | 47/44 |
| 5,144,768 | A | * | 9/1992 | Hiyama et al. | 47/46 |
| 5,638,636 | A | * | 6/1997 | Hiyama et al. | 47/44 |
| 5,797,214 | A | * | 8/1998 | Parrish et al. | 47/47 |
| 2002/0189160 | A1 | * | 12/2002 | Breitner | 47/1.7 |
| 2005/0072045 | A1 | * | 4/2005 | Parrish | 47/46 |
| 2005/0252076 | A1 | * | 11/2005 | Schloesser et al. | 47/46 |
| 2006/0150492 | A1 | * | 7/2006 | Kaprielian | 47/58.1 SC |
| 2009/0277083 | A1 | * | 11/2009 | Barnes | 47/46 |
| 2010/0043284 | A1 | * | 2/2010 | Smith et al. | 47/70 |
| 2013/0139435 | A1 | * | 6/2013 | Harrod et al. | 47/46 |

FOREIGN PATENT DOCUMENTS

| EP | 270931 | A1 | * | 6/1988 | A01G 17/18 |
| FR | 2740296 | A1 | * | 4/1997 | A01G 17/08 |
| GB | 2249010 | A | * | 4/1992 | A01G 17/08 |
| JP | 06141706 | A | * | 5/1994 | A01G 17/08 |

* cited by examiner

*Primary Examiner* — Son T Nguyen
(74) *Attorney, Agent, or Firm* — Felix L. Fischer (57) ABSTRACT

A vine support system includes support posts adjacent each vine trunk with support wires suspended between the support posts. Positioning shafts are mounted vertically extending from the support wires. Pedistular supports are engaged on the positioning shafts for releasably supporting canes extending from each vine trunk, with the pedistular supports vertically positioned on the positioning shafts for pronation by the canes to suspend new growth from the canes in a fruiting zone.

17 Claims, 13 Drawing Sheets

FIG. 1A

PRIOR ART

FIG. 1B

PRIOR ART

TRELLISING SYSTEM AND VITICULTURE METHOD

BACKGROUND

1. Field

This invention relates generally to the field of viticulture, in particular to the design and manufacture of grapevine trellis systems and to methods for grapevine canopy and crop management, and more particularly, to a trellis system having a novel structure for supporting grape vines using a gravity assisted architecture, in addition to a novel structure that allows for the instantaneous establishment of in-season shade canopies.

2. Description of the Related Art

Figure 1A:
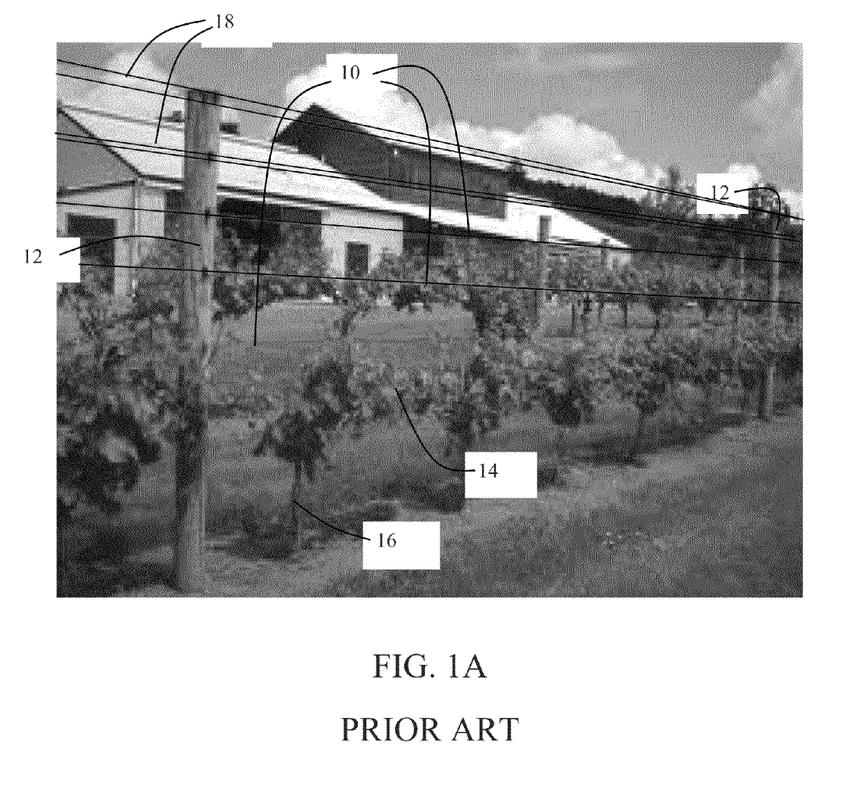
FIGS. 1A and 1B are examples of a prior art trellising approach used commonly in California viticulture.
Figure 1B:
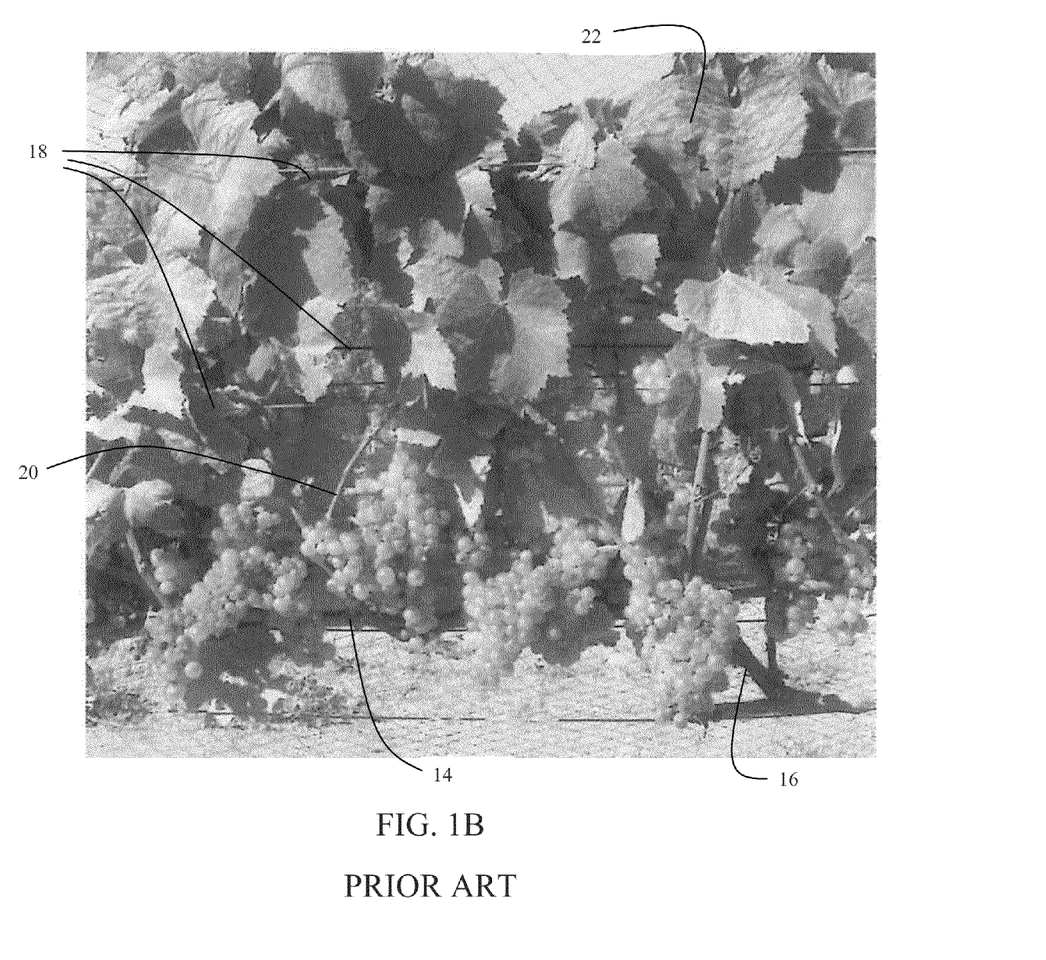

Vineyard management for both wine and table grapes has varied over many generations of farmers. With modern viticulture techniques consistency in crop yields and character particularly in wine grapes is being established Such consistency is imperative for creation of high quality wines. European and American viticulturalists have developed several predominant techniques for managing wine producing vines. FIG. 1A shows a prior art trellising approach for grape vines (Vertical Shoot Positioning "VSP") with support wires 10 extending between posts 12 and with cordons or fruiting canes 14 extending from the vine's trunks 16, supported horizontally by a lower wire 14 approximately 24 inches above ground, Trunks 16 are pruned to maintain this height. If cordons are established they are maintained yearly in this position 14. If fruiting canes are established, they are replaced by new canes yearly in this position 14. A series of upper wires 18 are then used to vertically support the shoots 20 extending from the cordons (or fruiting canes) with leaves forming the canopy 22 of the vine above the cordons as shown in greater detail in FIG. 1B.

This requires that the yearly growth of shoots, grapes and leaves be supported above the cordons or new canes which is a basically unstable position relying solely on the support of the trellis wires both vertically and laterally.

This technique does not provide optimum conditions for machine harvesting, nor does it proved optimum spring frost protection, and requires significant "structure" in the form of support wires and other devices to support the crop above the cordons, along with the requirement of significant labor in order to place the vines each year up into this structure, as well the significant labor that is necessary to prune the vines out of the structure at the end of each season.

It is therefore desirable to provide a novel infrastructure that supports the vines in such a way that it reduces the currently employed support structures as well as the costs required to operate them, while at the same time, maximizing wine quality, frost protection, and the efficiency of machine harvesting.

SUMMARY

The embodiments disclosed herein overcome the shortcomings of the prior art by providing a vine support system which includes support posts adjacent to each vine trunk with support wires suspended between the support posts. Cane pedestals are mounted with positioning shafts vertically extending from the support wires. Incorporated into the cane pedestals is a hub with at least one suspension arm which captures and supports the canes extending from each vine trunk at a position that is roughly 60 inches off the ground. The suspension arm extending from the hub is helical, allowing for the quick removal of spent fruiting canes along with the quick capturing of new fruiting canes during pruning. This helical design also encourages the fruiting canes to gradually pronate during the growing season, thereby allowing for the vine's new shoots to naturally grow downward with gravity, thereby inverting the vines canopy (compared to VSP), while still allowing for the controlled development of symmetry throughout the fruiting zone. Because the fruiting zone is now at the top of the vine's canopy, a second novel structure that allows for the instantaneous establishment of shade canopies can then be employed.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Embodiments shown in the drawings and described herein provide a viticultural method and system for alternative positioning of canes in individual grape vines at a higher level than normal prior art practice, nominally 48 to 60 inches with the trunk extending to that height. The canes are then horizontally positioned outward from the trunk held by "cane pedestals which support the canes vertically but allow rotation or pronation of the canes within the supporting suspension arms. At this higher level, as growth appears from the canes, instead of being supported above the cane, the canes pronate in the cane pedestals to allow the growth to hang downward, a much more natural positioning, which allows the weight of the fruit to be borne by the cane as opposed to being suspended in support wires. Positioning of the vineyard rows relative to a prevailing breeze additionally allows the force of the wind against the shoots and leaves to enhance the pronation of the canes to a hanging position.

For descriptive purposes herein, early in a season, new growth is typically referred to as a "shoot". A "cane" typically describes a mature shoot, one that has undergone a significant amount of lignification and has become pliable and/or woody.

Canes produced in any given season are considered to be "first year canes". Canes held over into a second year to be employed as the source for the subsequent year's growth are considered to be "second year wood, fruiting canes, or fruiting wood". During the winter subsequent to a growing season, the first year canes desired for the next year's growth are retained, as will be described subsequently, and the present system may be defined as cane pruned. The retained canes are laid out horizontally and at each bud on the canes, a new shoot emerges the next spring. On the new shoots resides the new crop.

Figure 2:
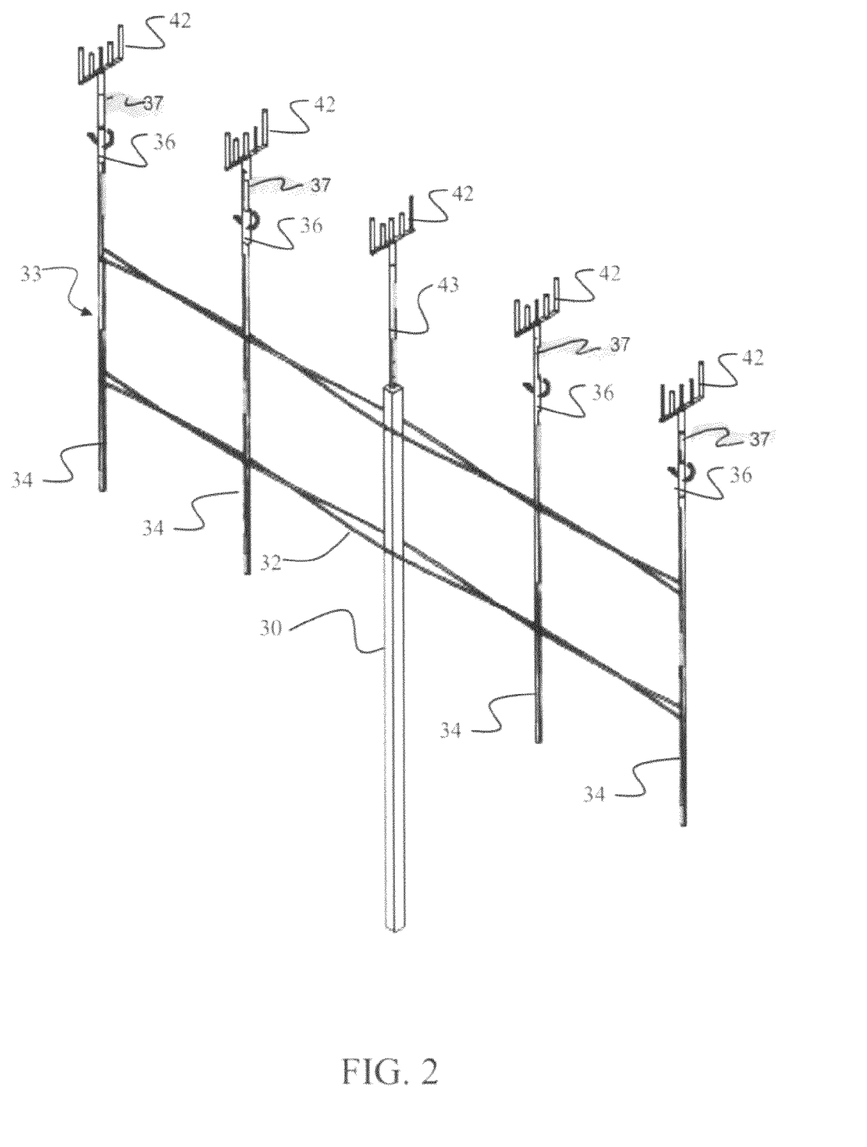
FIG. 2 is an isometric view of the support post elements for the inventive embodiment.
Figure 3A:
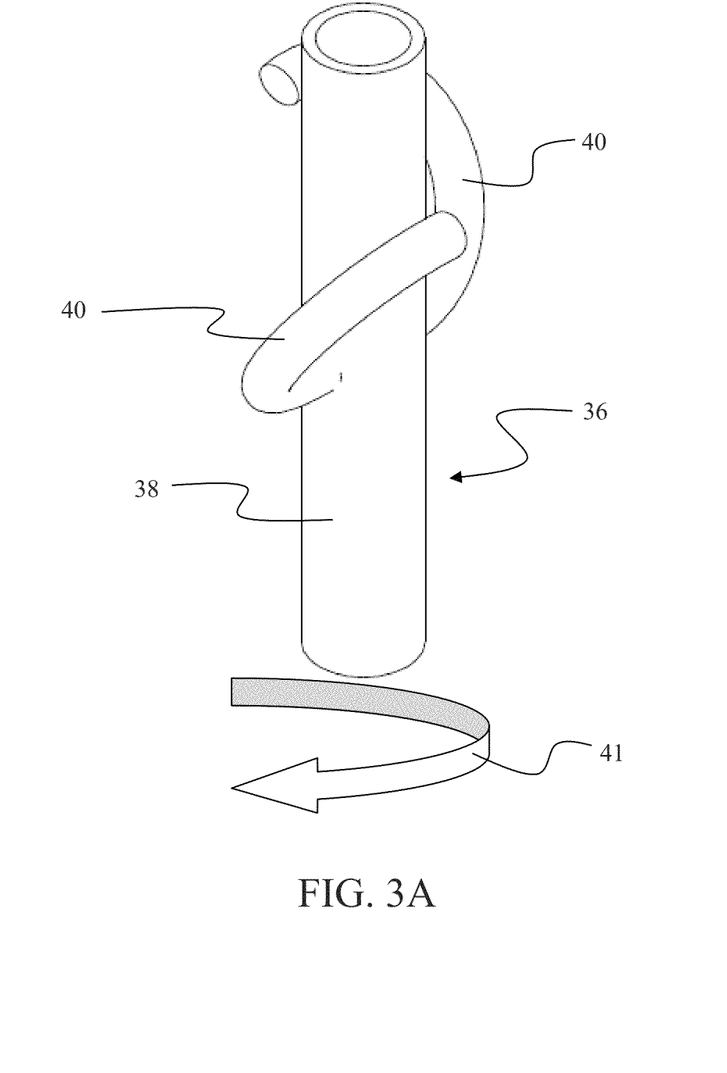
FIG. 3A is an isometric view of the pedestal assembly.
Figure 3B:
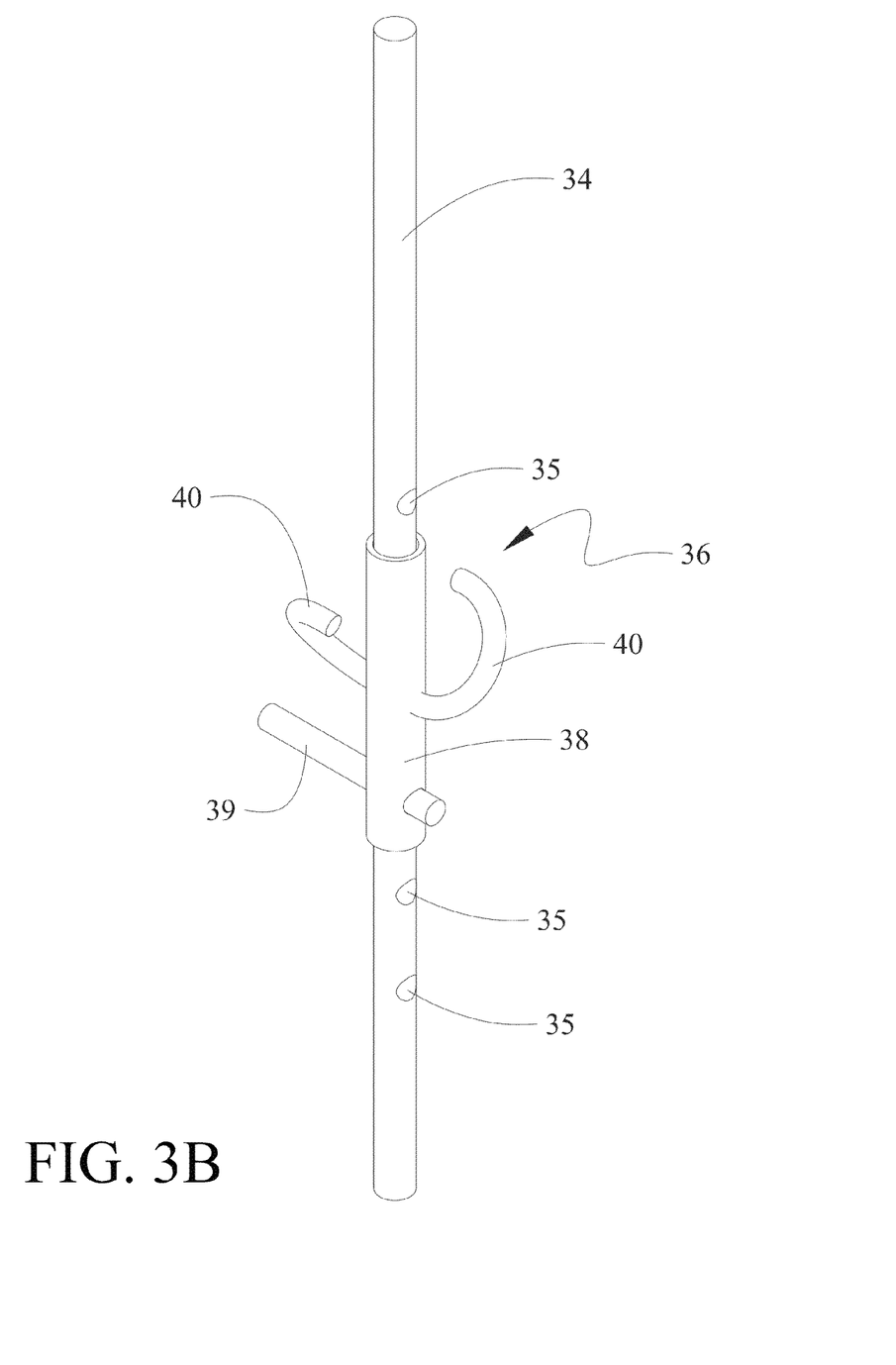
FIG. 3B is an isometric view of the cane pedestal with the hub of the pedestal assembly received over an exemplary positioning shaft with vertical adjustment pin.
Figure 3C:
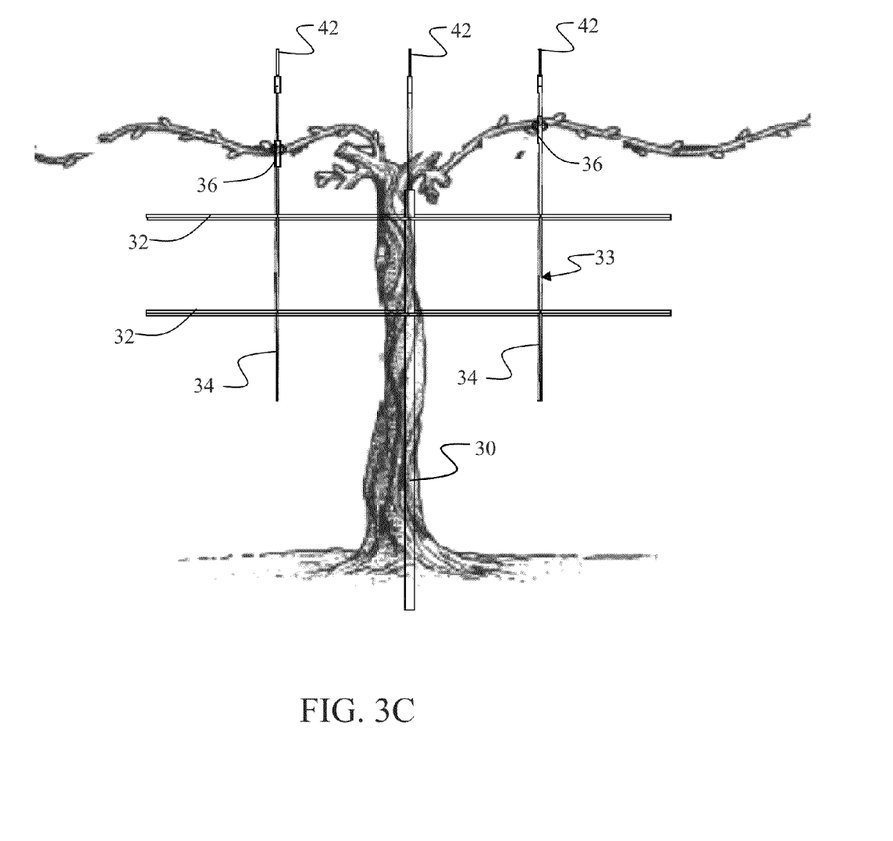
FIG. 3C is a front view of the vine stakes and cane pedestal assemblies supporting canes extending from a trunk.

As shown in FIG. 2 the embodiment for the infrastructure of the current invention employs vine stakes 30 placed at or near the trunk 31 of the vines (as seen in FIG. 3C) with support wire 32 extending laterally. In a first embodiment, cane pedestals 33 are supported by positioning shafts 34 suspended on the support wire which engage a helical pedestal assembly 36 shown in detail in FIG. 3A having a central attachment hub 38 and suspension arms 40 extending arcuately from the hub. The helical pedestal assembly may be rotated about the positioning shaft as shown by arrow 41 in FIG. 3A to free or engage the fruiting canes from the arcuate suspension arms 40 to provide pedestular support for the canes. In an exemplary embodiment, the suspension arms are helical in shape to enhance the engagement/disengagement of the canes by rotating the hub on the positioning shaft. The suspension arms have an effective diameter to sufficiently hold the canes loosely but allow the pronation of the canes without constraint. The hub 38 may additionally be adjustable vertically on the positioning shaft 34 to adjust the horizontal height of the fruiting canes as shown in FIG. 3B. Locking of the hub 38 at a desired height may be accomplished by pins 39 inserted through spaced holes 35 in the positioning shafts 34. The helical pedestal assembly 36 supports retained canes on the arcuate suspension arms 40 as shown in FIG. 3C.

Figure 3D:
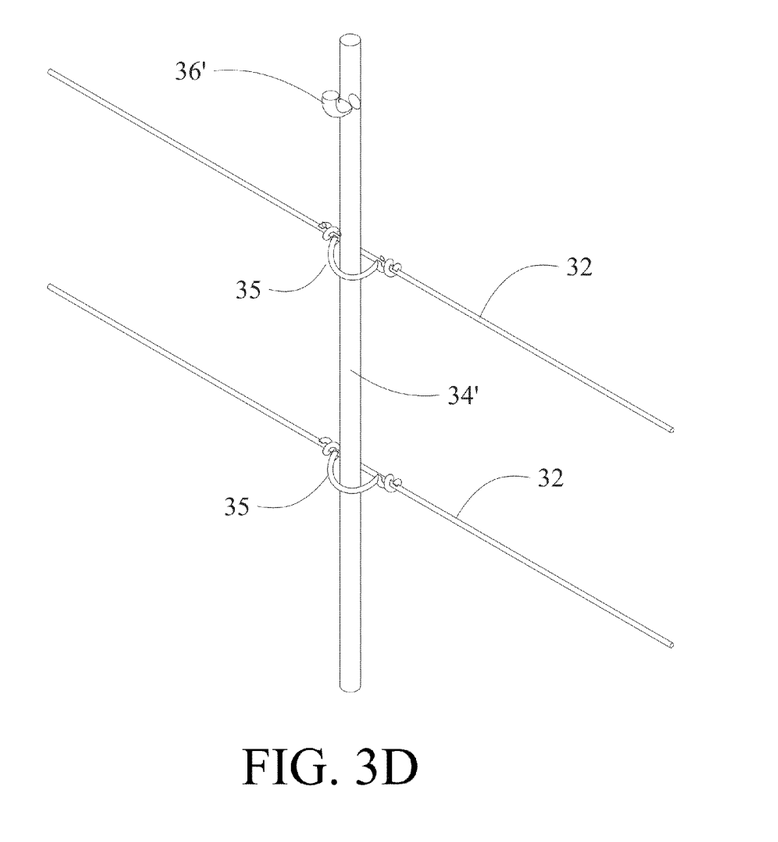
FIG. 3D is an isometric view of an alternative embodiment of the cane pedestal.

An alternative embodiment of the cane pedestal 33 is shown in FIG. 3D wherein the positioning shaft 34' is retained on the support wire 32 with a drag loop 35. This allows the positioning shaft 34' to be directly adjusted vertically without a separate hub and at least one suspension arm 36' extends directly from the positioning shaft 34'. The drag loop 35 additionally allows the positioning shaft 34' to be rotated thereby rotating the suspension arm 36', if desired, to engage or disengage the canes.

Figure 4A:
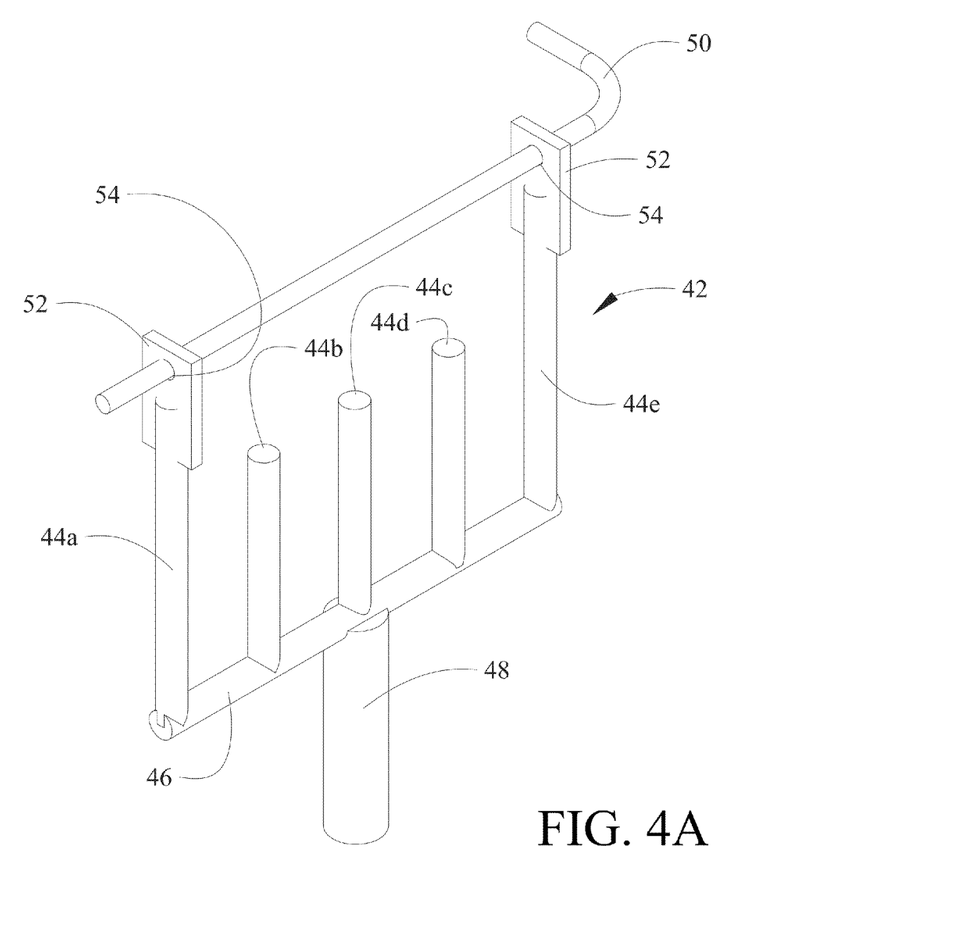
FIG. 4A is an isometric view of the canopy shade support tree (hotel)
Figure 4B:
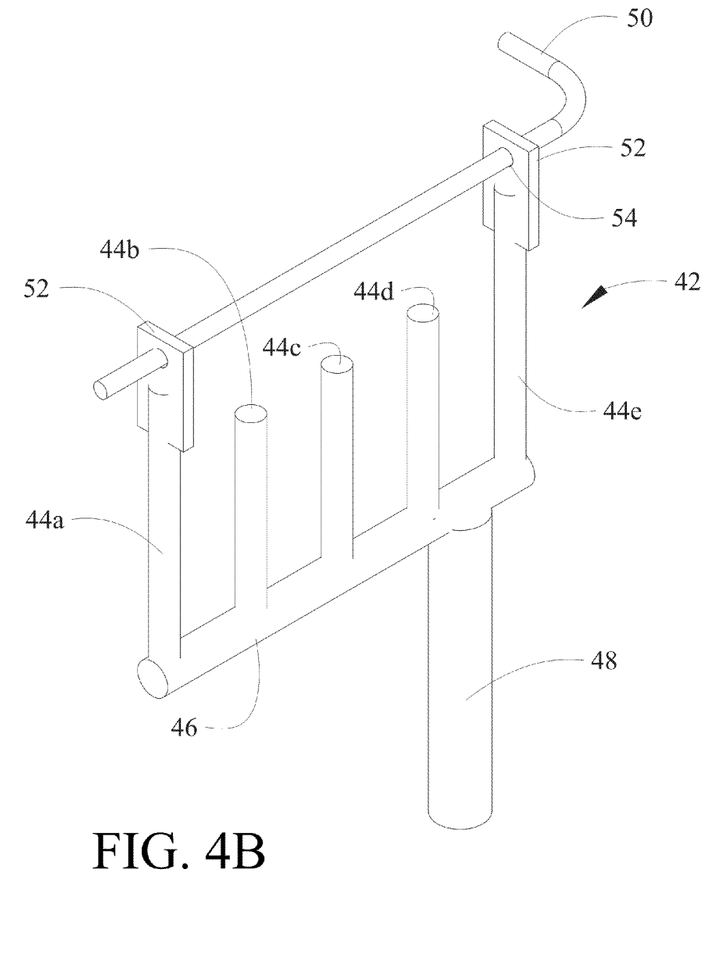
FIG. 4B is an isometric view of the hotel with an asymmetrical horizontal support.
Figure 4C:
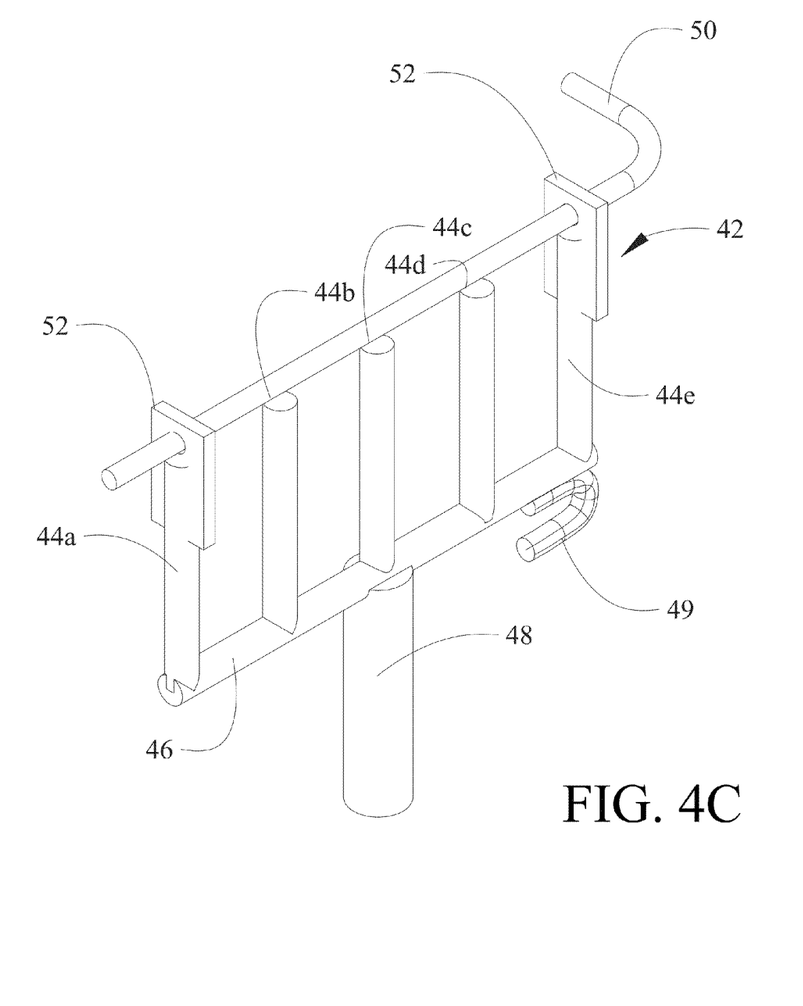
FIG. 4C is an isometric view of an alternative embodiment of the hotel with even vertical supports.

Additionally, in the middle of the growing season, a support tree or hotel 42, as shown in detail in FIG. 4A, is positioned on the crown 37 (as seen in FIG. 2) of each positioning shaft 34 and a crown rod 43 extending from the vine stakes 30 to support shoots and leaves in a longitudinal shade canopy, referred to as the "shade line", the source of which is a collection of green growing shoots which emanate every year from the trunks of the vines. The hotel includes vertical restraints 44a-44e extending from a horizontal support 46 which is attached to the positioning shafts with a cylindrical boss 48 having a bore to receive the crown of the positioning shaft. Shoots may be placed between the vertical restraints for horizontal separation and supported by horizontal support 46 to create a shade line for the fruit zone extending below the canes supported on the pedestal supports. A retainer 50 is received in tabs 52 located at the tops of the outboard vertical restraints 44a and 44e to constrain the threaded shoots in the hotel. For the embodiment shown, the tabs incorporate apertures 54 to receive the retainer 50. By slight angular offset of tabs 52, the retainer may be frictionally secured within the apertures. Sufficient flexibility of the tabs allows deformation for substantial alignment of the apertures for insertion and removal of the retainer 50. In alternative embodiments, flexible ties or other securing elements may be employed to extend from the outboard vertical restraints to restrain the shade canopy shoots. As will be described in greater detail subsequently, the hotel may employ an asymmetrical horizontal support as show in FIG. 4B for offset shading of the vines. Additionally, the vertical restraints may extend evenly from the horizontal support as shown in FIG. 4C or may have varying stepped heights. A "C" bracket 49 may be attached to the horizontal support 46 which allows the hotel to be suspended from a support wire when not in use.

Figure 4D:
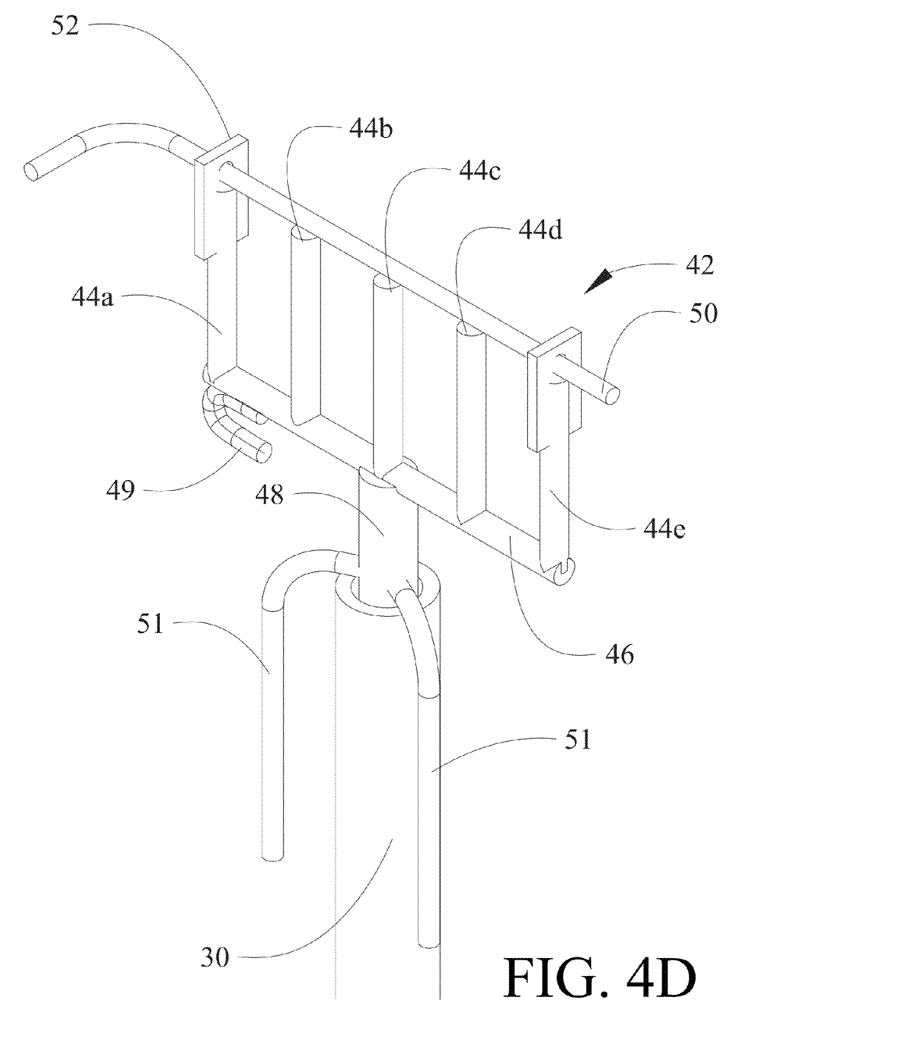
FIG. 4D is an isometric view of an embodiment of the hotel to be employed on vine stakes.
Figure 4E:
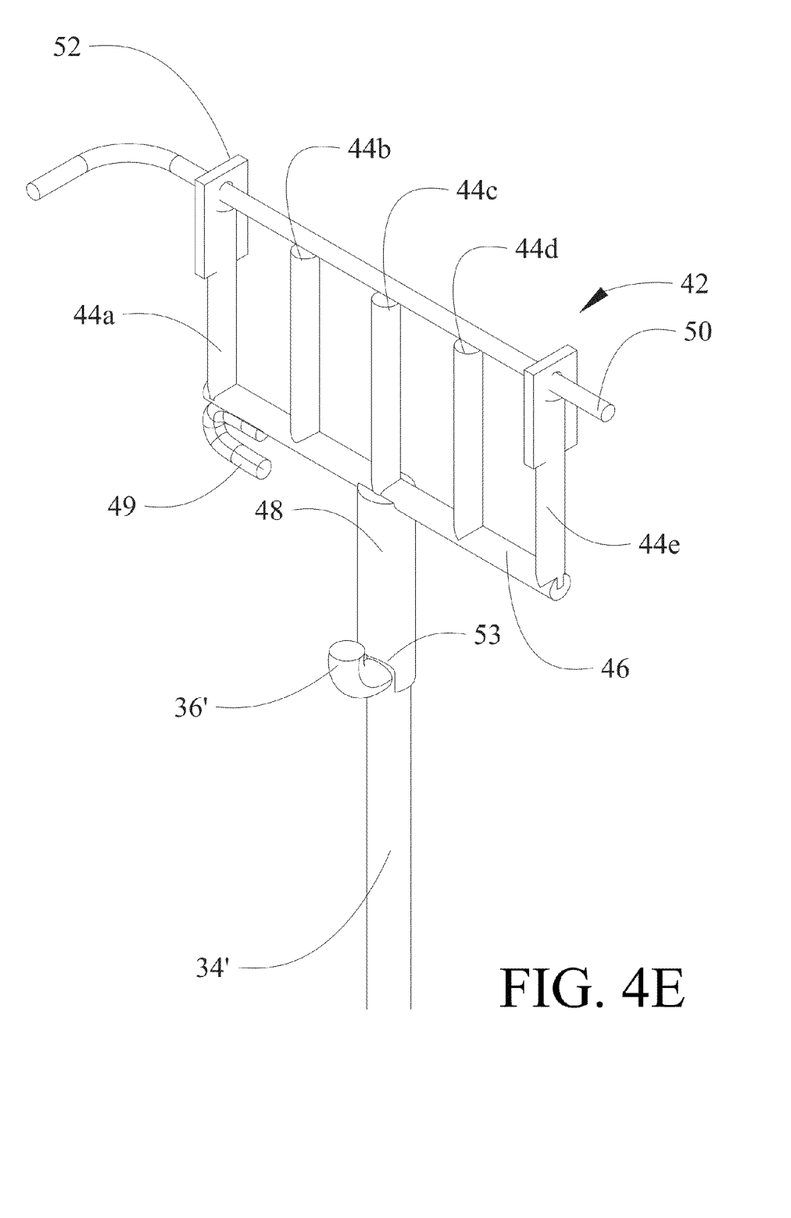
FIG. 4E is an isometric view of an embodiment of the hotel to be employed with a cane pedestal as shown in FIG. 3D.

For hotels employed on the vine stakes 30, as an alternative to a crown rod 43, the boss 48 may be concentrically received within the vine stake and supported from the top of the stake with one or more arms 51 as shown in FIG. 4D. Similarly, for implementations of the pedestal assembly as shown and described with respect to FIG. 3D, the boss 48 of the hotel may include a slot 53 which is received over the suspension arm 36' to prevent rotation of the boss and hotel on the crown of the positioning shaft 34' as shown in FIG. 4E.

The support wire 32 suspends the positioning shafts 34 from below. No wires are present in the zone of the fruiting canes or in the zone of the crop enhancing the fruiting canes' ability to pronate, thereby releasing most of the vine's shoots to easily grow, with gravity, in a downward direction. With less congestion in the fruiting zone, and with the crop in a more shakable position higher off the ground, mechanical harvesting is also enhanced. Additionally, the ability to remove the hotels 42 on and off of the support positioning shafts 34 and crown rods 43 provides unhindered growth of the vine's shoots resulting in the subsequent ease of overall canopy placement, the creation of shade lines, and a heightened speed of pruning.

To establish vines in the support system as described for the embodiments above, vine trunks are allowed to grow to approximately 48 to 60 inches. Selected fruiting canes are horizontally entrained in the suspension arms 40 of the pedestal assembly 36 which is the pronating portion of the canes, from opposite sides of adjacent trunks. Use of two opposing support arms 40 on the rotatable hub 38 for releasable support of the canes as shown in the drawings allows separate lateral positioning of the opposing canes; however, a single support arm may be employed in alternative embodiments with rotation of the hub freeing both opposing canes from the support arm. As previously described, rotation of the pedestal assembly 36 allows flexibility to engage or disengage the canes. As the fruit bearing shoots emerge from the canes, they gradually begin to be pushed downward by virtue of their increasing mass and by the encouragement of the pronation of the canes within the cane pedestals. Separate from this aspect of the vine's development, other shoots can be entrained longitudinally into the hotels from the vine's trunks to create a shade line with leaves above the canes and crop zone. Vertical adjustability of the rotatable hubs 38 on the positioning shafts 34 (or directly with drag loop supported positioning shafts 34') as previously described allows flexibility in creating the desired amount of separation between the crop zone, and the shade line.

Figure 5:
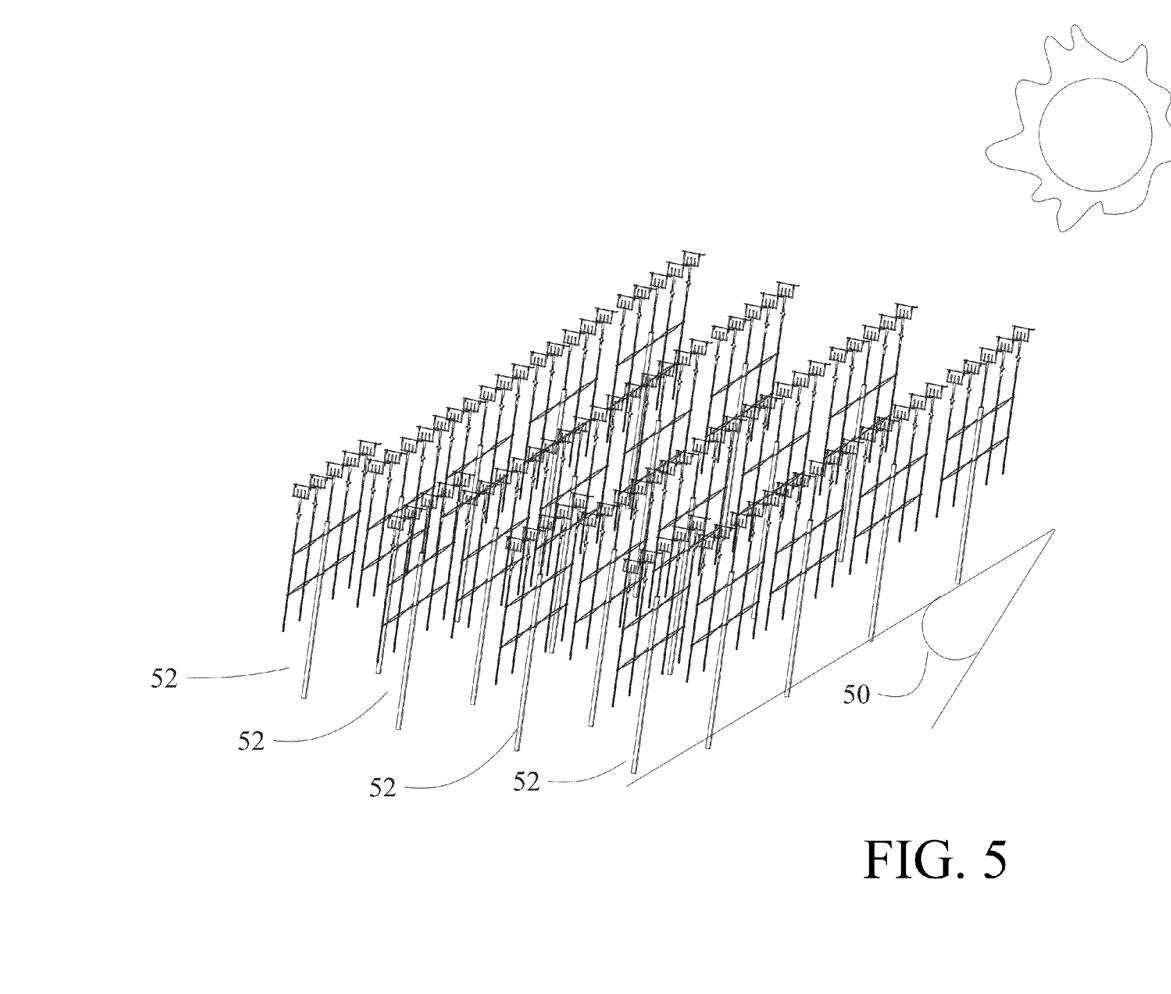
FIG. 5 is a pictorial view of a vineyard orientation adapted to maximize the benefits of the trellising system of the embodiments of FIGS. 2-4E.

Employing the trellising system as described, vineyard rows may be positioned angularly with respect to solar transit to allow the shade canopy created by the hotels to shade the remainder of the vines during the hottest portions of the day. As shown in FIG. 5, a predetermined angle 50 of vine rows 52 may be established for layout of the vineyard. Additionally or alternatively, the hotels may be asymmetrical with one side of the horizontal support 46 extending further off centerline for greater shade with the sun angle on one side of the vineyard rows during the hotter part of the day. Overall width of the hotel horizontal support for shading is determined to compensate for the particular requirements of the grape varietal in the vineyard. For instance, Pinot Noir grapes and similar varietals may employ a narrower width hotel while Chardonnay or similar varietals would employ a wider hotel for greater shade over or longer portion of the day.

In employing the vine support system as described in the embodiments above, vine rows are oriented for alignment of rows with sun angle at the highest solar exposure for scorching to allow the hotel with entrained shoots and leaves to shade the crop zone hanging from the pedestularly supported canes. As an example for a vineyard near Lompoc, Calif. in the Santa Rita Hills viticultural area, orientation of vine rows at 210 deg (30 degrees west of south) provides optimum shading. As previously described, the hotel may also be asymmetrical with the horizontal support extending a greater distance on one side than the other to promote shading in vineyard rows which are not directly oriented with the maximum sun exposure angle. This may occur where orientation of the rows for substantially perpendicularity to the prevailing breeze for enhanced pronation of the canes may result in a different row angle than the maximum sun exposure angle. Additionally, such asymmetry may be employed with the addition of the support embodiments disclosed herein to vines in existing vineyard rows which may be oriented without respect to sun angle.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A vine support system comprising:
   a plurality of vine stakes, each vine stake proximate a vine trunk;
   support wires suspended between the vine stakes;
   cane pedestals integrally supported by and extending above the support wires intermediate adjacent vine stakes; and,
   a plurality of suspension arms incorporated in each cane pedestal to support canes wherein each cane pedestal incorporates a positioning shaft extending from the support wires; hotels removably mounted to a crown of at least one of the positioning shaft to receive shoots for shade growth; crown rods extending from each vine stake, each crown rod carrying a removable hotel; wherein the hotels incorporate a horizontal support mounted to a boss received on the positioning shaft and the crown rods and a plurality of vertical restraints extending from the horizontal support to receive the shoots.

2. The vine support system as defined in claim 1 further comprising: a pedestal assembly engaged on each positioning shaft, said at least one suspension arm extending from the pedestal assembly for releasably supporting fruiting canes extending from each vine trunk, said pedestal assembly vertically positioned on the positioning shaft to accommodate pronation of fruiting canes so as to naturally deliver new growth into the fruiting zone.

3. The vine support system as defined in claim 2 wherein the pedestal assembly comprises a hub received on the positioning shaft, said hub having the at least one suspension arm extending therefrom for the pedestular support of fruiting canes.

4. The vine support system as defined in claim 3 wherein the hub is rotatable on the positioning shaft to engage or release a cane.

5. The vine support system as defined in claim 3 wherein the hub is vertically positionable on the positioning shaft.

6. The vine support system as defined in claim 1 wherein the at least one suspension arm extends from the positioning shaft and said positioning shaft is supported from the support wires by drag loops.

7. The vine support system as defined in claim 1 wherein the hotels further incorporate a removable retainer to secure the shoots within the hotel.

8. The vine support system as defined in claim 1 wherein the horizontal support is symmetrical with respect to the boss.

9. The vine support system as defined in claim 1 wherein the horizontal support is asymmetrical with respect to the boss.

10. The vine support system as defined in claim 1 wherein the vine stakes are aligned with a direction of maximum solar exposure.

11. The vine support system as defined in claim 1 wherein the vine stakes are aligned substantially perpendicular to a prevailing breeze.

12. A viticultural method for vine support comprising:
    providing the vine support system as claimed in claim 1;
    engaging the positioning shafts intermediate the a plurality of vine stakes positioned proximate an equal plurality of vine trunks; and,
    pedistularly supporting canes on the positioning shafts from adjacent vine trunks at between 48 and 60 inches above ground height.

13. The viticultural method as defined in claim 12 wherein the step of pedistularly supporting canes comprises:
    engaging canes on the plurality of suspension arms for pronation of the canes to suspend fruit in a fruiting zone.

14. The viticultural method as defined in claim 13 further comprising vertically adjusting rotatable hubs from which the plurality of suspension arms extend.

15. The viticultural method as defined in claim 12 further comprising:
    mounting the removable hotels at the crown of the positioning shafts; and, entraining shoots in the hotels to form a shade canopy.

16. The viticultural method as defined in claim 15 further comprising orienting the plurality of vine stakes and the positioning shaft at a desired angle for maximum shade by the shade canopy at a maximum solar exposure angle.

17. The viticultural method as defined in claim 15 wherein the hotels are asymmetrical for enhanced shading by the shade canopy on one side.

* * * * *